US012488377B2

(12) United States Patent
Chen

(10) Patent No.: US 12,488,377 B2
(45) Date of Patent: Dec. 2, 2025

(54) METHOD, APPARATUS, DEVICE AND MEDIUM FOR PROCESSING ITEM RECOMMENDATION

(71) Applicant: Beijing Youzhuju Network Technology Co., Ltd., Beijing (CN)

(72) Inventor: Yingyuan Chen, Beijing (CN)

(73) Assignee: BEIJING YOUZHUJU NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/544,005

(22) Filed: Dec. 18, 2023

(65) Prior Publication Data

US 2024/0119505 A1 Apr. 11, 2024

Related U.S. Application Data

(63) Continuation of application No. PCT/CN2023/119223, filed on Sep. 15, 2023.

(30) Foreign Application Priority Data

Sep. 16, 2022 (CN) .......................... 202211134376.2

(51) Int. Cl.
G06Q 30/00 (2023.01)
G06Q 30/0601 (2023.01)
(52) U.S. Cl.
CPC .............................. G06Q 30/0631 (2013.01)
(58) Field of Classification Search
CPC .............................................. G06Q 30/0631
(Continued)

(56) References Cited

U.S. PATENT DOCUMENTS

2011/0066497 A1* 3/2011 Gopinath ............... G06Q 30/02
705/14.53
2019/0318407 A1* 10/2019 Giridhari ........... G06Q 30/0627
2020/0065857 A1* 2/2020 Lagi ................... G06Q 30/0254

FOREIGN PATENT DOCUMENTS

CN 111800645 A 10/2020
CN 112001783 A 11/2020
(Continued)

OTHER PUBLICATIONS

Quadrana, Massimo, Paolo Cremonesi, and Dietmar Jannach. "Sequence-aware recommender systems." ACM computing surveys (CSUR) 51.4 (2018): 1-36. (Year: 2018).*

(Continued)

Primary Examiner — Anand Loharikar
(74) Attorney, Agent, or Firm — Astute IP Law Group

(57) ABSTRACT

The embodiments of the disclosure relates to a method, apparatus, device, and medium for item recommendation processing, wherein the method includes: in response to a recommendation request for an item recommendation initiation object, determining at least one candidate recommendation initiation object and a superior recommendation item category of each candidate recommendation initiation object; computing a recommendation matching degree between an item to be recommended and each candidate recommendation initiation object, respectively; determining a target recommendation initiation object for the item to be recommended in the at least one candidate recommendation initiation object according to the superior recommendation item category and the recommendation matching degree of each candidate recommendation initiation object; recommending the item to be recommended to the target recommendation initiation object, so that the target recommenda- (Continued)

tion initiation object performs recommendation processing on the item to be recommended.

20 Claims, 6 Drawing Sheets

(58) Field of Classification Search
USPC .............................................. 705/26.1–27.2
See application file for complete search history.

(56) References Cited

FOREIGN PATENT DOCUMENTS

| | | |
|---|---|---|
| CN | 112184300 A | 1/2021 |
| CN | 113205382 A | 8/2021 |
| CN | 113327121 A | 8/2021 |
| KR | 20220053398 A | 4/2022 |

OTHER PUBLICATIONS

International Search Report and Written Opinion in PCT/CN2023/119223, mailed Nov. 23, 2023, 9 pages.

* cited by examiner

METHOD, APPARATUS, DEVICE AND MEDIUM FOR PROCESSING ITEM RECOMMENDATION

CROSS-REFERENCE TO RELATED APPLICATIONS

This application is a continuation of International Patent Application No. PCT/CN2023/119223, filed on Sep. 15, 2023, which claims priority of Chinese Patent Application No. 202211134376.2, filed on Sep. 16, 2022, both of which are incorporated herein by reference in their entireties.

FIELD

The present disclosure relates to the technical field of computer applications, particularly to a method of item recommendation processing, apparatus, device and medium.

BACKGROUND

With the rise of computer technology, relying on short videos for Live-Streaming Marketing has become a common way to recommend items. Therefore, it is important for merchants to find "influencers" with strong recommendation capabilities to recommend items.

In related technologies, the "influencer" object is determined based on the number of followers on the marketing platform, and then the merchant selects a cooperative object from the "influencer" objects to recommend the items.

However, in the above method of selecting "influencers", the recommendation ability is only determined based on the number of followers. In fact, a large number of followers does not necessarily mean strong recommendation ability. Directly selecting "influencers" with a large number of followers to recommend items may lead to a low recommendation success rate of items.

SUMMARY

In order to solve the above technical problems or at least partially solve the above technical problems, the present disclosure provides a method of item recommendation processing, apparatus, device, and medium. The recommendation ability for the recommendation initiation object to the items to be recommended is determined, the initiation object is selected according to the recommendation ability for the items to be recommended, to achieve the intelligent determination for the recommend initiation object is achieved, and it is conducive to improving the recommendation success rate of items.

The embodiments of the present disclosure provide a method of item recommendation processing, the method comprising: in response to a recommendation request for an item recommendation initiation object, determining at least one candidate recommendation initiation object and a superior recommendation item category of each candidate recommendation initiation object; computing a recommendation matching degree between an item to be recommended and each candidate recommendation initiation object, respectively; determining a target recommendation initiation object for the item to be recommended in the at least one candidate recommendation initiation object according to the superior recommendation item category and the recommendation matching degree of each candidate recommendation initiation object; recommending the item to be recommended to the target recommendation initiation object, so that the target recommendation initiation object performs recommendation processing on the item to be recommended.

The embodiments of the present disclosure further provide an item recommendation processing device, the device comprising: a first determination module for in response to a recommendation request for an item recommendation initiation object, determining at least one candidate recommendation initiation object; a second determination module for determining a superior recommendation item category of each candidate recommendation initiation object; a computing module for computing a recommendation matching degree between an item to be recommended and each candidate recommendation initiation object, respectively; a third determination module for determining a target recommendation initiation object for the item to be recommended in the at least one candidate recommendation initiation object according to the superior recommendation item category and the recommendation matching degree of each the candidate recommendation initiation object; a recommendation processing module for recommending the item to be recommended to the target recommendation initiation object, so that the target recommendation initiation object performs recommendation processing on the item to be recommended.

The embodiments of the present disclosure further provide an electronic device, the electronic device comprising: a processor; a memory for storing processor executable instructions; the processor used to read the executable instructions from the memory and execute the executable instructions to implement the method of item recommendation processing provided by the embodiments of the present disclosure.

The embodiments of the present disclosure further provide a computer-readable storage medium, the storage medium stores a computer program for performing the method of item recommendation processing provided by the embodiments of the present disclosure.

The technical solution provided by the embodiments of the present disclosure has the following advantages compared to the art.

The item recommendation processing scheme provided by the embodiments of the present disclosure, in response to a recommendation request for an item recommendation initiation object, at least one candidate recommendation initiation object is determined, and a superior recommendation item category of each candidate recommendation initiation object is determined. A recommendation matching degree between an item to be recommended and each candidate recommendation initiation object is computed, respectively. A target recommendation initiation object for the item to be recommended in the at least one candidate recommendation initiation object is determined according to the superior recommendation item category and the recommendation matching degree of each candidate recommendation initiation object. The item to be recommended is recommended to the target recommendation initiation object, so that the target recommendation initiation object performs recommendation processing on the item to be recommended.

BRIEF DESCRIPTION OF THE DRAWINGS

In combination with the accompanying drawings and with reference to the following detailed description, the above and other features, advantages and aspects of various embodiments of the present disclosure will become more apparent. Throughout the drawings, the same or similar reference numerals represent the same or similar elements. It should be understood that the drawings are illustrative and that the components and elements are not necessarily drawn scale.

DETAILED DESCRIPTION

Figure 1:
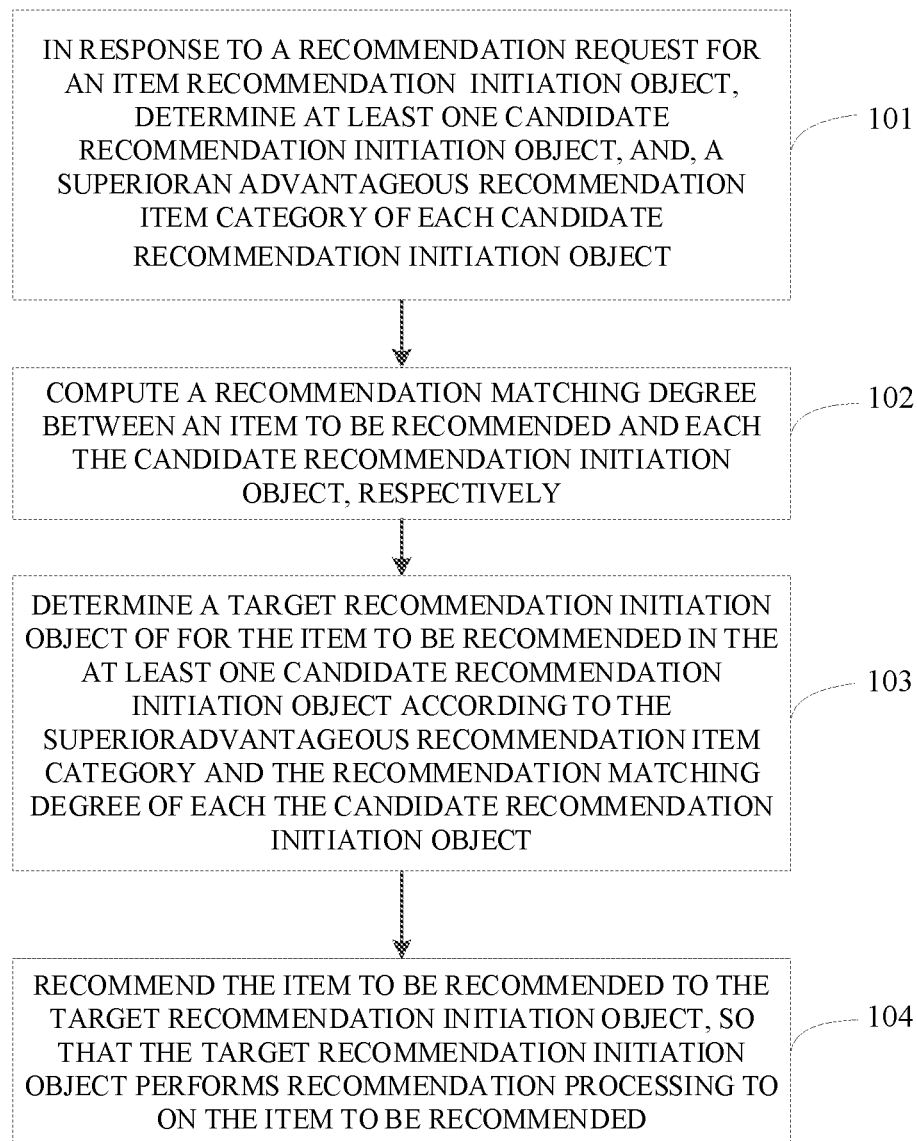
FIG. 1 is a schematic flow diagram of a method of item recommendation processing provided by the embodiments of the present disclosure.

The embodiments of the present disclosure will be described in more detail with reference to the accompanying drawings, in which some embodiments of the present disclosure have been illustrated. However, it should be understood that the present disclosure can be implemented in various manners, and thus should not be construed to be limited to embodiments disclosed herein. On the contrary, those embodiments are provided for the thorough and complete understanding of the present disclosure. It should be understood that the drawings and embodiments of the present disclosure are only used for illustration, rather than limiting the protection scope of the present disclosure.

It should be understood that various steps described in method implementations of the present disclosure may be performed in different order and/or in parallel. Furthermore, method implementations may include additional steps and/or omit steps that are shown. The scope of the present disclosure is not limited in this regard.

The terms "comprise" and its variants used herein are to be read as open terms that mean "include, but is not limited to." The term "based on" is to be read as "based at least in part on." The term "one embodiment" is to be read as "at least one embodiment," the term "another embodiment" is to be read as "at least one another embodiment," and the term "some embodiments" is to be read as "at least some embodiments." Other definitions, explicit and implicit, might be included below.

It should be noted that concepts "first," "second" and the like mentioned in the present disclosure are only used to distinguish between different apparatuses, modules or units, rather than limiting the order or interdependence of the functions performed by these apparatuses, modules or units.

It should be noted that modifications "one" and "more" mentioned in the present disclosure are schematic and not limiting, and should be understood as "one or more" to those skilled in the art unless otherwise specified.

Names of messages or information exchanged between the plurality of apparatuses in implementations of the present disclosure are used for illustrative purposes only and are not intended to limit the scope of those messages or information.

To facilitate the understanding of the embodiments of the present disclosure, some technical terms involved in the embodiments of the present disclosure are first explained as follows.

Recommendation initiation object: the recommendation initiation object is the recommender in the item recommendation scenario, for example, in the Live-Streaming marketing platform, the recommendation initiation object is "influencer" with strong marketing ability, etc.

Recommendation initiation object identifier: used to indicate the identifier of the corresponding recommendation initiation object, which may be an object name, an object account, object keywords, etc. of the recommendation initiation object.

Recommendation request object: a request object may be understood as an object with a recommendation request of a recommendation initiation object, for example, the "merchant" object with an "influencer" recommendation request in the Live-Streaming Marketing scenario.

Associated initiation object: may be understood as a recommendation initiation object that has a preset association relationship with the recommendation request object, for example, the associated initiation object may be some "influencer" objects that have a cooperative relationship with the "merchant", etc.

Item: the recommended object in the recommendation scenario, for example, in the Live-Streaming marketing platform, the item may be understood as the merchant's product, etc.

Item category: usually understood as the category of item. In some scenarios, to facilitate item management, an item category system is set up to category labeling. The item category system may include multiple levels of categories, and high-level categories may include one or more low-level categories. For example, "women's clothing" may be understood as the first-level category, "hanfu" and "sportswear" may be understood as the second-level category belonging to "women's clothing", etc.

Valid recommended item: a valid recommended item is an item recommended successfully by the candidate recommendation object. In the marketing platform, a valid recommended item may be understood as a recommended item sold by the candidate recommendation object. For example, if the recommended item w is recommended to a user 1, the user 1 places an order for the recommended item w, and the item w is a valid recommended item.

Recommendation ability: used to represent the ability of the candidate recommendation initiation object to successfully recommend the item to be recommended. The stronger the recommendation ability, the more likely the candidate recommendation initiation object is to recommend the item successfully. The weaker the recommendation ability, the more likely the candidate recommendation initiation object is to recommend the item unsuccessfully.

Recommendation matching degree: recommendation matching degree is used to accurately identify the strength of the recommendation ability of each candidate recommendation initiation object for the items to be recommended. The higher the recommendation matching degree, the stronger the recommendation ability of the candidate recommendation initiation object for the items to be recommended. The lower the recommendation matching degree, the weaker the recommendation ability of the candidate recommendation initiation object for the items to be recommended. The specific determination of the recommendation matching degree may refer to subsequent related embodiments, which will not be repeated here.

Superior recommendation item category: in the item category of all successfully recommended items for the candidate recommendation initiation object, the number of items meets a preset number condition, wherein the number of items of the item category successfully recommended under the preset number condition meets a preset number threshold. The preset number threshold is adjusted according to the actual situation. For example, for the candidate recommendation initiation object, if the number of items recommended successfully is located in the top TOP5 item category, it is considered to meet the above preset number threshold, so as to determine that the corresponding item category belongs to the superior recommendation item category, etc. For example, for the candidate recommendation initiation object A, if the number of successfully recommended items of the "women's clothing" category is ranked first among all items recommended by A, then the superior recommendation item category of the candidate recommendation initiation object A includes "women's clothing".

Item parameter: the item parameter corresponds to the parameter information describing the item in any dimension, for example, the item parameter may include an item category, a price range, etc.

In order to solve the above problems, the embodiments of the present disclosure provides a method of item recommendation processing, in which the recommendation ability for the recommendation initiation object to the items to be recommended is determined, the initiation object is selected according to the recommendation ability for the items to be recommended, the intelligent determination for the recommend initiation object is achieved, and it is conducive to improving the recommendation success rate of items. The method is described below in combination with specific embodiments.

FIG. 1 is a schematic flow diagram of a method of item recommendation processing provided by the embodiments of the present disclosure. The method may be performed by an apparatus for item recommendation processing, which may be implemented in software and/or hardware and may generally be integrated into an electronic device. As shown in FIG. 1, the method includes steps.

Step 101, in response to a recommendation request for an item recommendation initiation object, at least one candidate recommendation initiation object is determined, and a superior recommendation item category of each candidate recommendation initiation object is determined. It may be understood that after determining the candidate recommendation initiation object, the selection of the target recommendation initiation object is further determined to achieve this recommended item in the candidate recommendation initiation objects.

It should be noted that in different application scenarios, in response to the recommendation request of the item recommendation initiation object, the way of determining at least one candidate recommendation initiation object is different, as follows.

Figure 2:
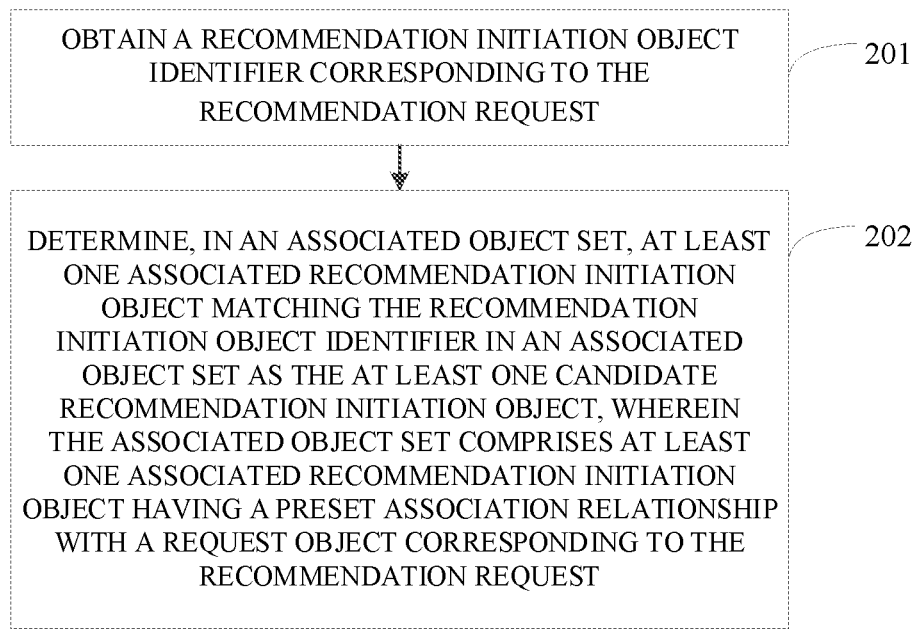
FIG. 2 is a schematic flow diagram of another method of item recommendation processing provided by the embodiments of the present disclosure.

In one embodiment of the present disclosure, as shown in FIG. 2, determining at least one candidate recommendation initiation object comprises steps.

Step 201, a recommendation initiation object identifier corresponding to the recommendation request is obtained.

Herein the recommendation initiation object identifier may be an object name, an object account, object keywords, etc. of the recommendation initiation object, in the present embodiment, may specify the recommendation initiation object identifier.

Figure 3:
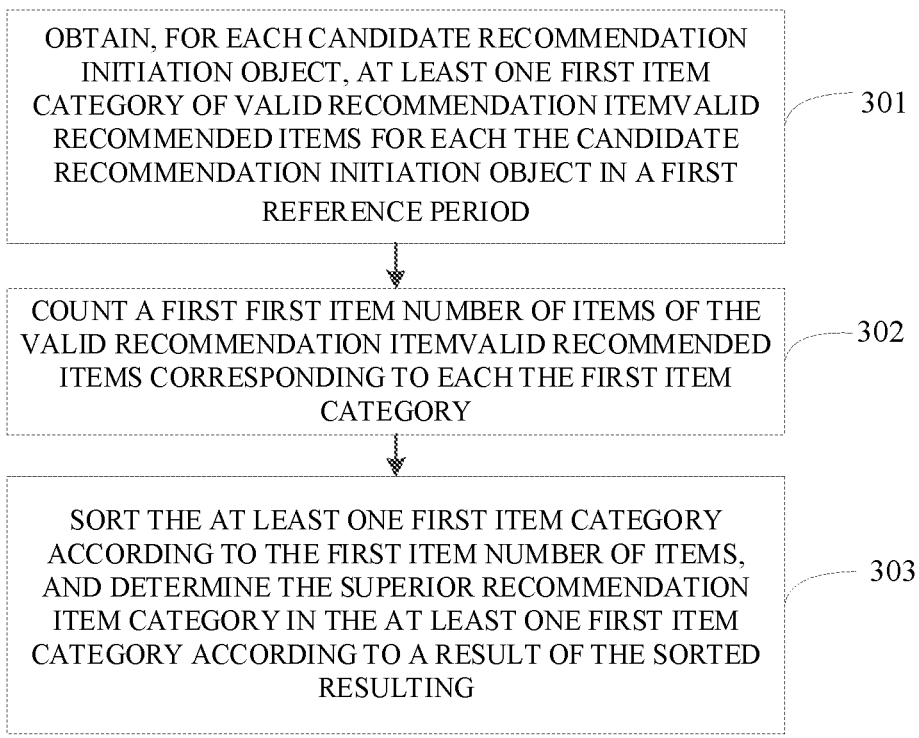
FIG. 3 is a schematic flow diagram of another method of item recommendation processing provided by the embodiments of the present disclosure.

In different application scenarios, ways of obtaining the recommendation initiation object identifier corresponding to the recommendation request is different, in some possible embodiments, as shown in FIG. 3, the recommend initiation object selection page may be displayed in response to the recommendation request, and the recommendation initiation object identifier entered on the page may be obtained.

Step 202, in an associated object set, at least one associated recommendation initiation object matching the recommendation initiation object identifier is determined as the at least one candidate recommendation initiation object, wherein the associated object set comprises at least one associated recommendation initiation object having a preset association relationship with a request object corresponding to the recommendation request.

It should be understood that the request object corresponding to the recommendation request may be a "merchant" object in the Live-Streaming Marketing scenario, wherein the associated initiation object with the preset association relationship may be understood as some "influencer" objects having a cooperative relationship with the "merchant". Of course, in other possible embodiments, the request object and the associated recommendation initiation object may also be other subjects with preset association relationships, which are not limited here.

In the present embodiment, a reference object identifier for each associated recommendation initiation object in the associated object set may be obtained, the reference object identifier matches the recommendation initiation object identifier, to determine that a successful match associated recommendation initiation object is at least one candidate recommendation initiation object.

In one embodiment of the present disclosure, a batch of recommendation initiation objects that meet the filtering conditions may be filtered as the candidate recommendation initiation object according to the scene, and the filtering conditions may be set according to the scene. For example, the object level of the request initiation object for recommendation request may be obtained, and the matched recommendation initiation object may be filtered according to the object level. For example, a preset product category of the recommendation initiation object may be obtained, the item category of the item to be recommended may be determined, and in the preset product category, the recommend initiation object of the item category including the item to be recommended is filtered as the candidate recommendation initiation object, etc.

In some possible embodiments, the superior recommendation item category may be a first-level category in the item category system, for example, the superior recommendation item category of the candidate recommendation initiation object B may include "women's clothing, beauty and skincare, digital products" and the like, wherein the number of superior recommendation item category may be set according to the scene, which is not limited.

Step 102, a recommendation matching degree between an item to be recommended and each candidate recommendation initiation object is computed, respectively.

In order to finely determine the recommendation ability of each candidate recommendation initiation object for an item to be recommended, in one embodiment of the present disclosure, the recommendation matching degree between the item to be recommended and each candidate recommendation initiation object is also computed, wherein the higher the recommendation matching degree, it indicates that the stronger the recommendation ability of the corresponding candidate recommendation initiation object for the items to be recommended.

In some possible embodiments, when the at least one candidate recommendation initiation object has a plurality of candidate recommendation initiation objects, the candidate recommendation initiation objects may be sorted according to the recommendation matching degree from high to low order to generate a sorted list, so as to intuitively based on the sorted list known the corresponding matching degree between the item to be recommended and each candidate recommendation initiation object.

Herein, the method of item recommendation processing in this embodiment may be applicable to a scenario containing one item to be recommended, or may be applicable to a scenario containing a plurality of items to be recommended. In the scenario containing a plurality of items to be recommended, each recommendation processing method for each item to be recommended is the same. Herein, the item to be recommended in this embodiment may be an item to be promoted by the request object corresponding to the recommendation request, or it may be an item to be promoted by other objects that have a cooperative relationship with the request object, etc.

Step 103, a target recommendation initiation object for the item to be recommended is determined in the at least one candidate recommendation initiation object according to the superior recommendation item category and the recommendation matching degree of each candidate recommendation initiation object.

It is easy to understand that, as mentioned above, the superior recommendation item category is used to identify the item category with strong recommendation ability for each candidate recommendation initiation object, and the recommendation matching degree is used to accurately identify the recommendation ability of each candidate recommendation initiation object for the items to be recommended. Therefore, in connection with the superior recommendation item category and the recommendation matching degree, the target recommendation initiation object for the item to be recommended is determined in the at least one candidate recommendation initiation object, so as to ensure that the target recommendation initiation object has strong recommendation ability for the item to be recommended, which guarantees the recommendation success rate of the item to be recommended.

Step 104, the item to be recommended is recommended to the target recommendation initiation object, so that the target recommendation initiation object performs recommendation processing on the item to be recommended.

In one embodiment of the present disclosure, an item to be recommended is recommended to the target recommendation initiation object, so that the target recommendation initiation object performs recommendation processing on the item to be recommended. Since the recommendation ability of the target initiation object for the items to be recommended is strong, therefore, the target recommendation initiation object has a higher success rate of the item to be recommended.

In some possible embodiments, the step of recommending the item to be recommended to the target recommendation initiation object includes: obtaining recommendation reason information and item detail information for the item to be recommended, wherein the recommendation reason may be edited by the request object, and the recommendation reason is usually used to persuade the corresponding target recommendation object to accept the corresponding recommendation request. Of course, the recommendation reason may also be randomly selected in the preset templates, etc. The item detail information includes item pricing, item pictures, item function descriptions, etc. The specific content contained in the item detail information may be set according to the needs of the scene.

Further, an item recommendation link corresponding to the recommendation reason information and item detail information is generated, wherein the item recommendation link may be any style of QR code style, URL link style, etc. The specific style of the item recommendation link may be negotiated with the request object by the target recommendation initiation object according to preferences, etc. After generating the item recommendation link, the item recommendation link is recommended to the target recommendation initiation object.

Thus, the target recommendation initiation object may know the corresponding recommendation reason information and item detail information by triggering the item recommendation link. If the acceptance recommendation operation by the target recommendation object is obtained, the corresponding item to be recommended may be added to an item set to be recommended for the target recommendation object to perform the corresponding recommendation processing, for example, may be added to the "shop window" tool of the target recommendation object, to be shown to the follower objects of the target recommendation object to achieve recommendation.

In this embodiment, the acceptance recommendation operation mode of the target recommendation object is different in different application scenarios. In some optional embodiments, the item recommendation link may also include control information for "confirm recommendation". Therefore, after detecting that the target recommendation object triggers the corresponding item recommendation link, the control for "confirm recommendation" may be displayed. If detecting that the target recommendation object triggers the control for "confirming recommendation", the acceptance recommendation operation of the target recommendation object is obtained.

In summary, the method of item recommendation processing of the embodiments of the present disclosure, in response to a recommendation request for an item recommendation initiation object, at least one candidate recommendation initiation object is determined, and a superior recommendation item category of each candidate recommendation initiation object is determined. A recommendation matching degree between an item to be recommended and each candidate recommendation initiation object is computed, respectively. A target recommendation initiation object for the item to be recommended in the at least one candidate recommendation initiation object is determined according to the superior recommendation item category and the recommendation matching degree of each candidate recommendation initiation object. The item to be recommended is recommended to the target recommendation initiation object, so that the target recommendation initiation object performs recommendation processing on the item to be recommended. Therefore, in connection with the superior recommendation item category of the candidate recommendation initiation object itself and the recommendation matching degree of the item to be recommended, the target recommendation initiation object for item recommendation is determined, that is, the recommendation ability for the recommendation initiation object to the items to be recommended is determined, the initiation object is selected according to the recommendation ability for the items to be recommended, the intelligent determination for the recommend initiation object is achieved, and it is conducive to improving the recommendation success rate of items.

The following in connection with specific embodiments illustrates how to determine the superior recommendation item.

In some possible embodiments, as shown in FIG. 3, the superior recommendation item category of each candidate recommendation initiation object is determined, including steps.

Step 301, for each candidate recommendation initiation object, at least one first item category of valid recommended items in a first reference period is obtained.

Herein the time period corresponding to the first reference period may be set according to the needs of the scene, for example, the first reference period may be a time period within the nearest 30 days from the current time. The valid recommended items may be understood as the items successfully recommended by the candidate recommendation object. In the marketing platform, the valid recommended item may be understood as the recommended item having been sold by the candidate recommendation object.

In the present embodiment, for each candidate recommendation initiation object, at least one first item category of valid recommended items in the first reference period is obtained, that is, the first item category of the item having been recommended successfully is identified, wherein the first item category may be understood as the first-level category of the item category system and the like.

Step 302, a first number of items of the valid recommended items corresponding to each first item category is counted.

In the present embodiment, the first number of valid recommended items corresponding to each first item category is counted, so as to determine the sales of items in each first item category within the items successfully having been recommended by the candidate recommendation initiation object according to the first number of items.

Step 303, the at least one first item category is sorted according to the first number of items, and the superior recommendation item category is determined in the at least one first item category according to a result of the sorting.

In one embodiment of the present disclosure, at least one first item category may be sorted according to the first number of items from high to low order, herein, i.e., in the present embodiment, the result of the sorting is more front, it indicates that in the first reference period, apparently the recommendation success rate of items in the corresponding first item category item may be higher, and thus, that is, the recommendation ability for the corresponding first item category is stronger. Therefore, in order to determine the superior recommendation item category with stronger recommendation ability, in the present embodiment, according to the result of the sorting in at least one first item category the superior recommendation item category is determined, for example, according to the order of the result of the sorting from front to back a preset number of first item category is determined as superior recommendation item category, wherein the preset number may be calibrated according to the needs of the scene, for example, if the preset number is 5, according to the result of the sorting the first item categories in the top 5 are selected as the superior recommendation item category.

Figure 4:
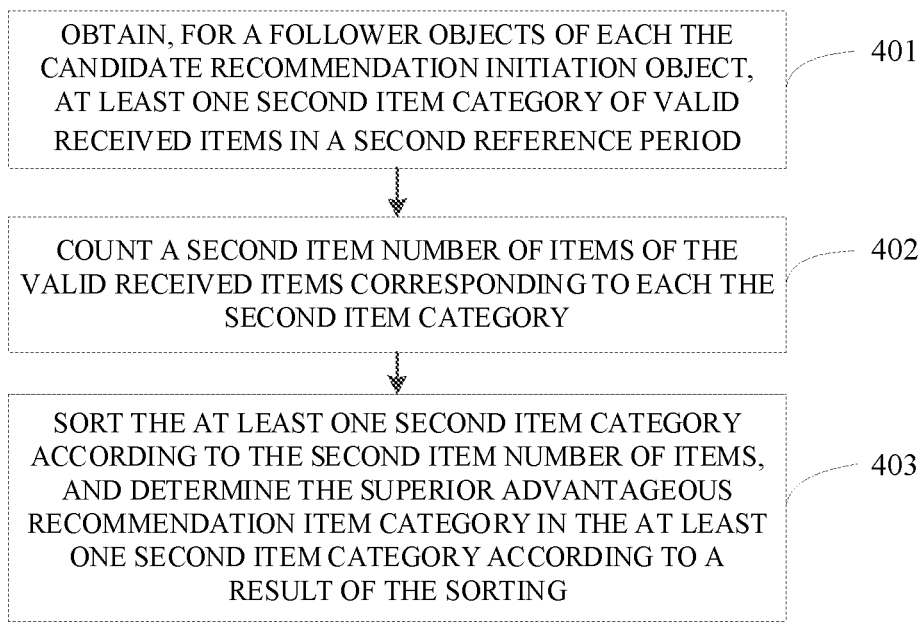
FIG. 4 is a schematic flowchart of another method of item recommendation processing provided by the embodiments of the present disclosure.

In some possible embodiments, as shown in FIG. 4, the superior recommendation item category of each candidate recommendation initiation object is determined, including steps.

Step 401, for follower objects of each candidate recommendation initiation object, at least one second item category of valid received items in a second reference period is obtained.

Herein, the time period corresponding to the second reference period may be set according to the needs of the scene. For example, the second reference period may be a time period within the nearest 30 days from the current time. In addition, the follower objects may be understood as "fan" objects of the candidate recommendation initiation object, etc. The follower objects usually prioritize watching the recommended content of the candidate recommendation object. The valid received items may be understood as the items having been successfully received by the follower objects. In the marketing platform, the valid received items may be understood as the items having been successfully purchased by the follower objects. Herein, the recommendation initiation object of the valid received items may be any recommendation initiation object in the corresponding platform, not necessarily the candidate recommendation initiation object followed by the follower objects.

Since the follower objects are the recommendation audience for the candidate recommendation initiation objects, further mining the demand for the follower objects may obtain the potential item category that each candidate recommendation initiation object is likely to recommend successfully. In one embodiment of the present disclosure, for follower objects of each candidate recommendation initiation object, at least one second item category of valid received items in a second reference period is obtained, that is, the second item category of the items having been purchased by the follower objects is identified, wherein the second item category may be understood as the first-level category in the item category system, etc.

Step 402, a second number of items of the valid received items corresponding to each second item category is counted.

In the present embodiment, the second number of items of the valid received items corresponding to each second item category is counted, so as to determine purchase amount of the items of each second item category in the items having been successfully received by the follower objects according to the second number of items.

Step 403, the at least one second item category is sorted according to the second number of items, and the superior recommendation item category in the at least one second item category is determined according to a result of the sorting.

In one embodiment of the present disclosure, at least one second item category may be sorted according to the second number of items from high to low order, herein, i.e., in the present embodiment, the result of the sorting is more front, it indicates that in the second reference period, apparently the recommendation success rate of items in the corresponding second item category item may be higher, and thus, that is, the recommendation ability for the corresponding second item category is stronger. Therefore, in order to determine the superior recommendation item category with stronger recommendation ability, in the present embodiment, according to the result of the sorting in at least one second item category the superior recommendation item category is determined, for example, according to the order of the result of the sorting from front to back a preset number of second item category is determined as superior recommendation item category, wherein the preset number may be calibrated according to the needs of the scene, for example, if the preset number is 5, according to the result of the sorting the second item categories in the top 5 are selected as the superior recommendation item category.

In some possible embodiments, determining superior recommendation item category of each candidate recommendation initiation object may include the determination shown in FIGS. 3 and 4. Herein, in the present embodiment, when determining the second item category, in order to further mine the potential recommendation category of the recommendation initiation object, the second item category duplicating with the first item category may also be removed from the second item categories, and according to the result of the sorting corresponding to the second item category, the second item category different from the first item category is sequentially determined as a substitute.

In summary, the method of item recommendation processing of the embodiment of the present disclosure, the superior recommendation item category of the candidate recommendation initiation is mined, as a reference for subsequently determining the target recommendation initiation object for the items to be recommended, and it is conducive to improve the recommendation success rate of items.

The following with reference to the embodiments describes how to compute the recommendation matching degree between the item to be recommended and each candidate recommendation initiation object.

In one embodiment of the present disclosure, at least one recommendation matching factor value between the item to be recommended and each candidate recommendation initiation object is determined. Each recommendation matching factor is used to represent, in the corresponding dimension, the recommendation matching degree between the item to be recommended and each candidate recommendation initiation object. The higher the recommendation matching degree, the higher the recommendation success rate for identifying the corresponding candidate recommendation initiation object to the item to be recommended.

Furthermore, after determining at least one recommendation matching factor value, the recommendation matching degree is computed according to the at least one recommendation matching factor value. For example, for each recommendation matching factor value, the recommendation matching factor value is normalized to obtain a normalized value corresponding to the recommendation matching factor value; a preset weight value corresponding to the recommendation matching factor value is obtained, and a product calculation on the preset weight value to the recommendation matching factor value and the normalized value is performed to obtain t a product value corresponding to the recommendation matching factor value. The product values corresponding to the plurality of recommendation matching factor values respectively are summed as the recommendation matching degree.

For example, when the normalized value of the recommendation matching factor value corresponding to a certain candidate recommendation object includes a, b, c, and d, the corresponding preset weight values are 0.2, 0.2, 0.3, and 0.3, respectively, and the recommendation matching degrees are 0.2a+0.2b+0.3c+0.3d.

It should be noted that in the actual implementation process, the way to determine at least one recommendation matching factor value between the item to be recommended and each candidate recommendation initiation object includes one or more of the following embodiments.

In some possible embodiments, a first item parameter of valid recommended items of each candidate recommendation initiation object within a third reference period is obtained, and a second item parameter of the item to be recommended is obtained, wherein the time period corresponding to the third reference period may be set according to the needs of the scene. For example, the third reference period may be the time period within the nearest 30 days from the current time. In addition, the parameter categories corresponding to the first item parameter and the second item parameter are the same. In different application scenarios, the first item parameter and the second item parameter contain different parameters, for example, the first item parameter may include an item category of the valid recommended items of each candidate recommendation initiation object within the third reference period (in order to finely determine the recommendation ability of each candidate recommendation initiation object for an item to be recommended, the item category may be a second category in the item category system, etc.), price range, etc., then the corresponding second item parameter includes the item category, the price range, etc. of the item to be recommended.

In the present embodiment, the second item parameter is matched with the first item parameter, according to the result of matching a third number of items successfully matched in the valid recommended items within the third reference period is determined, and the third number of items is determined as the recommendation matching factor value.

For example, in the marketing platform, when the second item parameter includes the item category, the price range, etc. of the item to be recommended, the third number of items may be understood as, within the third reference period, the sales of items belonging to the same item category and price range item as the item to be recommended.

That is, in the present embodiment, according to the actual case of item recommendation for each candidate recommendation initiation object, the recommendation ability to the items to be recommended is determined.

In some possible embodiments, for follower objects of each candidate recommendation initiation object, a third item parameter of valid received items within a fourth reference period is obtained, and an item to be recommended fourth item parameter is obtained.

Herein, the time period corresponding to the fourth reference period may be set according to the needs of the scene. For example, the third reference period may be the time period within the nearest 30 days from the current time. In addition, the parameter categories corresponding to the third item parameter and the fourth item parameter are the same. In different application scenarios, the third item parameter and the fourth item parameter contain different parameters, for example, the fourth item parameter may include the follower objects of the candidate recommendation initiation object, an item category of the valid recommended items of each candidate recommendation initiation object within the fourth reference period (in order to finely determine the recommendation ability of each candidate recommendation initiation object for an item to be recommended, the item category may be a second category in the item category system, etc.), price range, etc., then the corresponding fourth item parameter includes the item category, the price range, etc. of the item to be recommended, wherein the valid received items within the fourth reference period are not necessarily the items recommended by the candidate recommendation initiation object of the follower objects, and may be items recommended by any recommendation initiation object in the marketing platform.

In the present embodiment, the third item parameter is matched with the fourth item parameter, according to the result of matching a fourth number of items successfully matched in the valid recommended items within the fourth reference period is determined, and the fourth number of items is determined as the recommendation matching factor value.

For example, in the marketing platform, when the fourth item parameter includes the item category, price range, etc. of the item to be recommended item, the fourth number of items may be understood as the follower objects of the candidate recommendation initiation object within the fourth reference period, the purchase amount of items belonging to the same item category and price range as the item to be recommended.

That is, in the present embodiment, according to the actual case of ordered items by the follower objects of each candidate recommendation initiation object, the potential recommendation ability of each candidate recommendation initiation object for the items to be recommended is mined.

In some possible embodiments, a similar recommendation initiation object fulfilling a preset similar condition with each candidate recommendation initiation object is determined. For example, the recommendation initiation object which has a repetition rate between the recommendation item category and the recommendation item category of the candidate recommendation initiation object greater than a preset repetition threshold is used as the similar recommendation initiation object which fulfills a preset similar condition with each candidate recommendation initiation object. For example, in the marketing scene, the recommendation initiation object which has the same recommendation item category of the marketing TOP3 with the recommendation item category of the marketing TOP3 for the candidate recommendation initiation object is used as the similar recommendation initiation object which fulfills a preset similar condition with each candidate recommendation initiation object.

Further, the valid recommended items of the similar recommendation initiation object in a fifth reference period are obtained. A fifth number of items of valid recommended items matching with the item to be recommended in the valid recommended items within the fifth reference period is determined (herein, the valid recommended item matching with the item to be recommended may be a valid recommended item matching exactly the same item to be recommended, or it may be a valid recommended item matching a similar item to be recommended). The fifth number of items is determined as the recommendation matching factor value, wherein the time period corresponding to the fifth reference period may be set according to the needs of the scene, for example, the fifth reference period may be the time period within the nearest 30 days from the current time.

That is, in the present embodiment, through the recommendation ability of the similar recommendation initiation object for the items to be recommended, the recommendation ability of the corresponding candidate recommendation initiation object for the items to be recommended is speculated.

In some possible embodiments, the valid recommended items of each candidate recommendation initiation object within a sixth reference period are obtained, wherein the time period corresponding to the sixth reference period may be set according to the needs of the scene, for example, the sixth reference period may be the time period within the nearest 30 days from the current time.

A sixth number of items with a similarity to the item category of the item to be recommended greater than a preset similarity threshold in the valid recommended items within the sixth reference period is counted, and the sixth number of items is determined as the recommendation matching factor value.

That is, in the present embodiment, according to the recommendation ability of the candidate recommendation initiation object for the item similar to the item category of the item to be recommended, the recommendation ability of the candidate recommendation initiation object for the items to be recommended is predicted.

Herein, the above-mentioned item parameter of the item to be recommended may be input by the request object in the corresponding page, and the above-mentioned recommendation matching factor may also be actively selected or may be actively obtained by querying in a preset database according to an item identifier of the item to be recommended. In addition, the recommendation matching factor in this embodiment may also be used as a reference for the recommendation reason when recommending the item to be recommended to the target recommendation initiation object. For example, when the recommendation matching factor value is the fifth number of items mentioned above, in some possible LIVE scenarios, "similar recommendation influencers sell more than 1000 of the items within 30 days" may be displayed as a reference for the recommendation reason.

In summary, the method of item recommendation processing of the embodiment of the present disclosure, the recommendation matching degree between the item to be recommended and each candidate recommendation initiation object may be computed, the recommendation ability of each candidate recommendation initiation object for the items to be recommended is finely determined, which further facilitates improving the recommendation success rate of items.

Based on the above embodiments, in different application scenarios, according to the superior recommendation item category and the recommendation matching degree, the way for determining the target recommendation initiation object for the item to be recommended in the at least one candidate recommendation initiation object is different, the examples are as follows.

In one embodiment of the present disclosure, in the at least one candidate recommendation initiation object, an initial recommendation initiation object corresponding to the superior recommendation item category comprising the item category of the item to be recommended is determined, that is, in the at least one candidate recommendation initiation object, the initial recommendation initiation object with strong recommendation ability for the item category of the items to be recommended is firstly filtered.

Further, in case of a plurality of the initial recommendation initiation objects being obtained, the initial recommendation initiation object corresponding to the highest value of a plurality of recommendation matching degrees corresponding to the plurality of the initial recommendation initiation objects is determined as the target recommendation initiation object, that is, secondly, in the initial recommendation initiation objects, the initial recommendation initiation object with the strongest recommendation ability for the items to be recommended is filtered as the target recommendation initiation object.

When one initial recommendation initiation object is obtained, the initial recommendation initiation object may be directly used as the target recommendation initiation object.

In one embodiment of the present disclosure, in order to improve the interaction of the request object, the target recommendation initiation object for the item to be recommended may also be manually determined.

In the present embodiment, a recommendation page is displayed, wherein the recommendation page comprises the at least one candidate recommendation initiation object, and the superior recommendation item category and recommendation matching degree corresponding to the at least one candidate recommendation initiation object. In response to receiving a trigger operation on the recommendation page, the candidate recommendation initiation object corresponding to the trigger operation is determined as the target recommendation initiation object.

Figure 5:
FIG. 5 is a schematic diagram of an item recommendation processing scenario provided by the embodiments of the present disclosure.

For example, as shown in FIG. 5, when the candidate recommendation initiation object includes D1 to D10, the relevant information of D1 to D10 contained in the corresponding recommendation page, and the recommendation matching degree and superior recommendation item category corresponding to D1 to D10. Herein, the item category of the item to be recommended may be input in the recommendation page, and the item category of the item to be recommended may be input via a selection control of the corresponding item category triggered by the request object. In this recommendation page, the item parameters of the item to be recommended and the like may also be manually selected and input.

Figure 6:
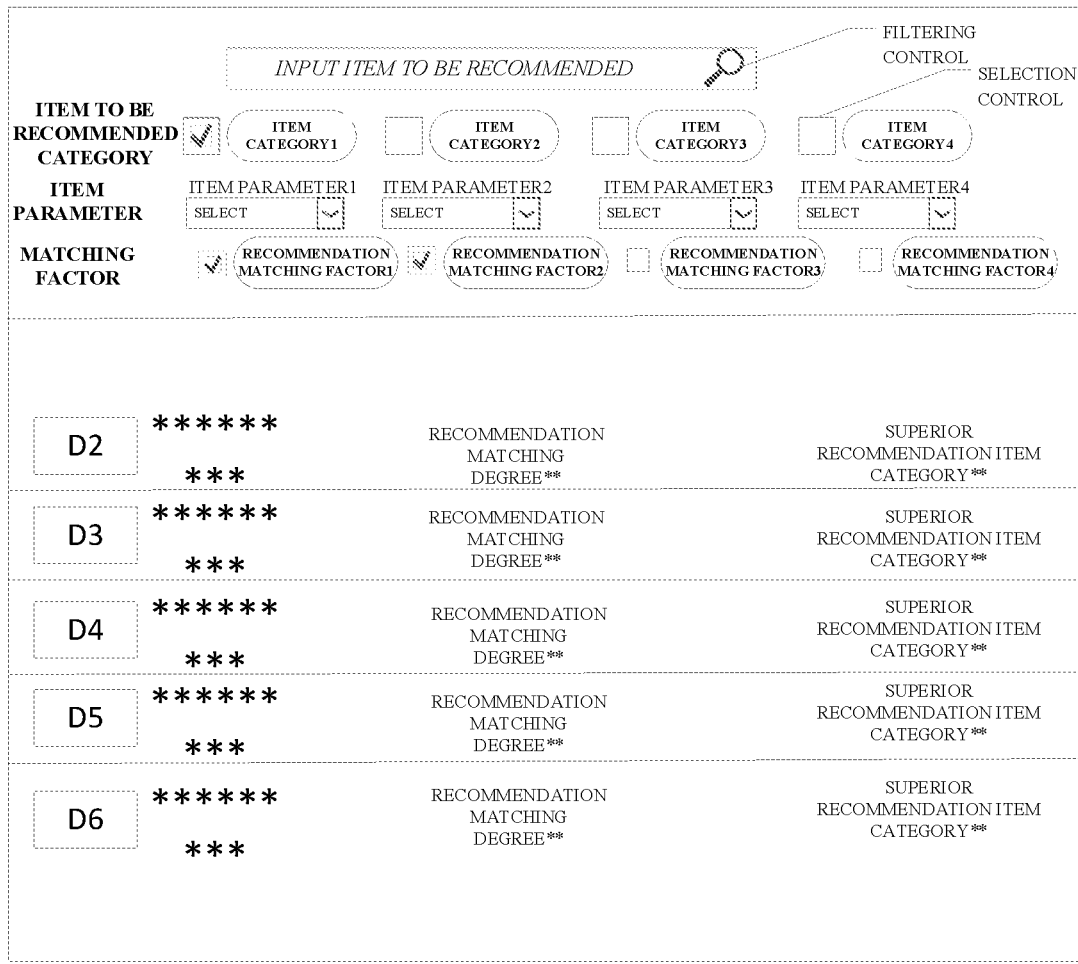
FIG. 6 is a schematic diagram of another item recommendation processing scenario provided by the embodiments of the present disclosure.

When a preset filtering control is triggered, D1 to D10 are filtered and sorted according to the selected item category and recommendation matching factor, or the item to be recommended may be input in the filtering text box corresponding to the filtering control. The corresponding item category is matched according to the item to be recommended, as shown in FIG. 6, when the item category of the item to be recommended is item category 1, and the recommendation matching factors include recommendation matching factor 1 and recommendation matching factor 2, in the superior recommendation item category corresponding to D1 to D10, the candidate recommendation initiation object containing the item category of the item to be recommended is filtered as D2 to D6, wherein the results of the sorting in the order of recommendation matching degree from high to low are D2 to D6. The request object may select the corresponding target recommendation object in D2 to D6.

Herein, in the present embodiment, with continued reference to FIG. 5, the recommendation matching factor corresponding to the recommendation matching degree may be selected by the request object, for example, when the recommendation matching thus comprises recommendation matching factors 1 to 4, the request object may trigger the selection control corresponding to the recommendation matching factor to select the recommendation matching factor corresponding to the current recommendation matching degree.

In summary, the method of item recommendation processing of the embodiments of the present disclosure may flexibly select the target recommendation initiation object to meet the personalized selection requirements of the target recommendation object.

To implement the above embodiments, the present disclosure also proposes an apparatus for item recommendation processing.

Figure 7:
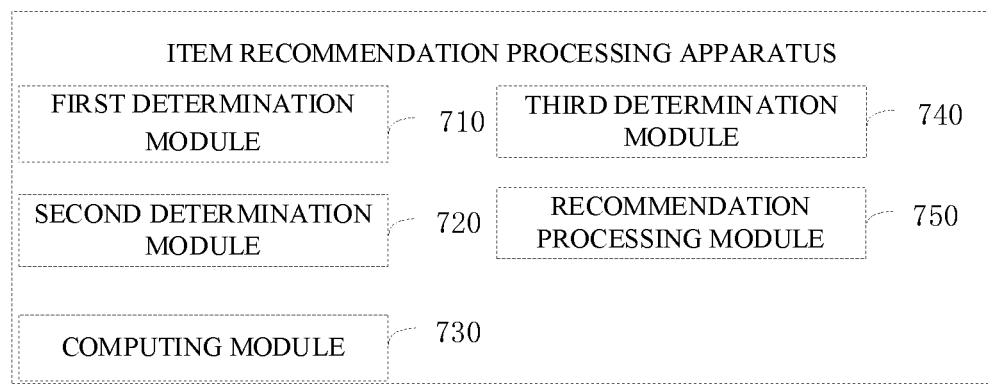
FIG. 7 is a structural schematic diagram of an apparatus for item recommendation processing provided by the embodiments of the present disclosure.

FIG. 7 is a structural schematic diagram of the item recommendation processing device provided by the embodiments of the present disclosure. The apparatus may be implemented by software and/or hardware and may generally be integrated into an electronic device for item recommendation processing. As shown in FIG. 7, the apparatus includes: a first determination module 710, a second determination module 720, a computing module 730, a third determination module 740, and a recommendation processing module 750, herein, the first determination module for in response to a recommendation request for an item recommendation initiation object, determining at least one candidate recommendation initiation object;

the second determination module for determining a superior recommendation item category of each candidate recommendation initiation object;

the computing module for computing a recommendation matching degree between an item to be recommended and each candidate recommendation initiation object, respectively;

the third determination module for determining a target recommendation initiation object for the item to be recommended in the at least one candidate recommendation initiation object according to the superior recommendation item category and the recommendation matching degree of each the candidate recommendation initiation object;

the recommendation processing module for recommending the item to be recommended to the target recommendation initiation object, so that the target recommendation initiation object performs recommendation processing on the item to be recommended.

The apparatus for item recommendation processing provided by the embodiments of the present disclosure may perform the method of item recommendation processing provided by any of embodiments of the embodiments of the present disclosure, having corresponding functional modules and beneficial effects for performing the method, similar to the implementation principle, not described herein again.

In order to implement the above embodiments, the present disclosure also provides a computer program product, comprising a computer program/instructions, when executed by a processor, the computer program/instructions to implement the method of item recommendation processing of the above-described embodiments.

Figure 8:
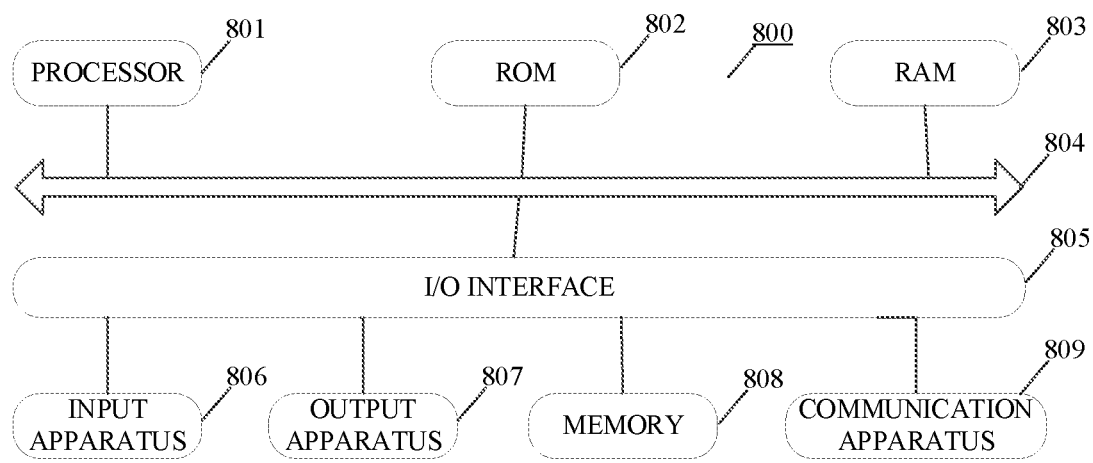
FIG. 8 is a structural schematic diagram of an electronic device provided by the embodiments of the present disclosure.

FIG. 8 is a structural schematic diagram of an electronic device provided by the embodiments of the present disclosure.

Below with specific reference to FIG. 8, which shows a structural schematic diagram of an electronic device suitable for implementing the embodiments of the present disclosure. The electronic device 800 in the embodiments of the present disclosure may include, without limitation to, a mobile terminal such as a mobile phone, a laptop computer, a digital broadcast receiver, a PDA (personal digital assistant), a PAD (tablet computer), a PMP (portable multimedia player), an on-board terminal (e.g., on-board navigation terminal) and the like, as well as a fixed terminal such as a digital TV, a desktop computer and the like. The electronic device shown in FIG. 8 is merely an example and should not be construed to impose any limitations on the functionality and use scope of the embodiments of the present disclosure.

As shown in FIG. 8, the electronic device may comprise processor (e.g., a central processor, a graphics processor) 801 which is capable of performing various appropriate actions and processes in accordance with programs stored in a read only memory (ROM) 802 or programs loaded from memory 808 to a random access memory (RAM) 803. In the RAM 803, there are also stored various programs and data required by the electronic device 800 when operating. The processor 801, the ROM 802 and the RAM 803 are connected to one another via a bus 804. An input/output (I/O) interface 805 is also connected to the bus 804.

Usually, the following means may be connected to the I/O interface 805: input apparatus 806 including a touch screen, a touch pad, a keyboard, a mouse, a camera, a microphone, an accelerometers, a gyroscope, or the like; output apparatus 807, such as a liquid-crystal display (LCD), a loudspeaker, a vibrator, or the like; memory 808, such as a magnetic tape, a hard disk or the like; and communication apparatus 809. The communication apparatus 809 allows the electronic device 800 to perform wireless or wired communication with other device so as to exchange data with another device. While FIG. 8 shows the electronic device 800 with various means, it should be understood that it is not required to implement or have all of the illustrated means. Alternatively, more or less means may be implemented or exist.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication apparatus 809, or installed from the memory 808, or installed from the ROM 802. The computer program, when executed by the processor 801, perform the above functions defined in the method of the embodiments of the present disclosure.

It should be noted that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium including or storing a program that may be used by or in conjunction with an instruction executing system, apparatus or device. In the present disclosure, the computer readable signal medium may include data signals propagated in the baseband or as part of the carrier waveform, in which computer readable program code is carried. Such propagated data signals may take a variety of forms, including without limitation to electromagnetic signals, optical signals, or any suitable combination of the foregoing. The computer readable signal medium may also be any computer readable medium other than a computer readable storage medium that may send, propagate, or transmit a program for use by, or in conjunction with, an instruction executing system, apparatus, or device. The program code contained on the computer readable medium may be transmitted by any suitable medium, including, but not limited to, a wire, a fiber optic cable, RF (radio frequency), etc., or any suitable combination thereof.

In some implementations, the client and server may communicate utilizing any currently known or future developed network protocol such as HTTP (HyperText Transfer Protocol) and may be interconnected with digital data communications (e.g., communication networks) of any form or medium. Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above computer readable medium may be contained in the above electronic device; or it may exist separately and not be assembled into the electronic device.

The above computer readable medium carries one or more programs which, when executed by the electronic device, cause the electronic device to: in response to a recommendation request for an item recommendation initiation object, at least one candidate recommendation initiation object is determined, and a superior recommendation item category of each candidate recommendation initiation object is determined. A recommendation matching degree between an item to be recommended and each candidate recommendation initiation object is computed, respectively. A target recommendation initiation object for the item to be recommended in the at least one candidate recommendation initiation object is determined according to the superior recommendation item category and the recommendation matching degree of each candidate recommendation initiation object. The item to be recommended is recommended to the target recommendation initiation object, so that the target recommendation initiation object performs recommendation processing on the item to be recommended. Therefore, in connection with the superior recommendation item category of the candidate recommendation initiation object itself and the recommendation matching degree of the item to be recommended, the target recommendation initiation object for item recommendation is determined, that is, the recommendation ability for the recommendation initiation object to the items to be recommended is determined, the initiation object is selected according to the recommendation ability for the items to be recommended, the intelligent determination for the recommend initiation object is achieved, and it is conducive to improving the recommendation success rate of items.

The electronic device may be one or more program designing languages or a combination thereof to write computer program code for carrying out operations of the present disclosure, the above-described programming languages include without limitation to an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Units involved in the embodiments of the present disclosure as described may be implemented in software or hardware. The name of a unit does not form any limitation on the module itself.

The functionality described above may at least partly be performed, at least in part, by one or more hardware logic components. For example and in a non-limiting sense, exemplary types of hardware logic components that can be used include: field-programmable gate arrays (FPGA), application specific integrated circuits (ASICs), application specific standard products (ASSPs), systems on chips (SOCs), complex programmable logic devices (CPLDs), etc.

In the context of the present disclosure, the machine readable medium may be a tangible medium that can retain and store programs for use by or in conjunction with an instruction execution system, apparatus or device. The machine readable medium of the present disclosure can be a machine readable signal medium or a machine readable storage medium. The machine readable medium may include, but is not limited to, an electronic, magnetic, optical, electromagnetic, infrared or semiconductor system, apparatus or device, or any combination of the foregoing. More specific examples of the machine readable storage medium may include, without limitation to, the following: an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The foregoing description is merely illustration of the preferred embodiments of the present disclosure and the technical principles used herein. Those skilled in the art should understand that the disclosure scope involved therein is not limited to the technical solutions formed from a particular combination of the above technical features, but should also cover other technical solutions formed by any combination of the above technical features or their equivalent features without departing from the above disclosure concepts, e.g., technical solutions formed by replacing the above features with technical features having similar functions disclosed (without limitation) in the present disclosure.

In addition, although various operations have been depicted in a particular order, it should not be construed as requiring that the operations be performed in the particular order shown or in sequential order of execution. Multitasking and parallel processing may be advantageous in certain environments. Likewise, although the foregoing discussion includes several specific implementation details, they should not be construed as limiting the scope of the present disclosure. Some features described in the context of separate embodiments may also be realized in combination in a single embodiment. On the contrary, various features described in the context of a single embodiment may also be realized in multiple embodiments, either individually or in any suitable sub-combinations.

Although the subject matter has been described in language specific to structural features and/or methodological logical actions, it should be understood that the subject matter defined in the appended claims is not necessarily limited to the particular features or actions described above. On the contrary, the particular features and actions described above are merely exemplary forms of implementing the claims.

I claim:

1. A method for transmitting item information, wherein the method comprises the following steps:
   in response to a recommendation request for an item recommendation initiation object displaying a recommendation page of an application, by an electronic device, wherein the recommendation page comprises at least one candidate recommendation initiation object and a superior recommendation item category of each candidate recommendation initiation object, wherein the superior recommendation item category comprises a recommendation item category which is successfully recommended to each candidate recommendation initiation object and a number of items meets a predetermined number threshold;
   computing, by the electronic device, a recommendation matching degree between an item to be recommended and each candidate recommendation initiation object, respectively, wherein the recommendation matching degree is used to identify a strength of a recommendation ability of each candidate recommendation initiation object for the items to be recommended,
     wherein computing, by the electronic device, the recommendation matching degree between the item to be recommended and each candidate recommendation initiation object comprises:
     determining, by the electronic device, at least one recommendation matching factor value between the item to be recommended and each candidate recommendation initiation object;
     computing, by the electronic device, the recommendation matching degree according to the at least one recommendation matching factor value,
   determining, by the electronic device, a target recommendation initiation object for the item to be recommended in the at least one candidate recommendation initiation object according to the superior recommendation item category and the recommendation matching degree of each candidate recommendation initiation object; and
   in accordance with a determination of the target recommendation initiation object, transmitting information related to the item to the target recommendation initiation object.

2. The method according to claim 1, wherein determining the at least one candidate recommendation initiation object comprises:
  obtaining a recommendation initiation object identifier corresponding to the recommendation request;
  determining, in an associated object set, at least one associated recommendation initiation object matching the recommendation initiation object identifier as the at least one candidate recommendation initiation object, wherein,
  the associated object set comprises at least one associated recommendation initiation object having a preset association relationship with a request object corresponding to the recommendation request.

3. The method according to claim 1, wherein determining the superior recommendation item category of each candidate recommendation initiation object comprises:
  obtaining, for each candidate recommendation initiation object, at least one first item category of valid recommended items in a first reference period;
  counting a first number of items of the valid recommended items corresponding to each first item category;
  sorting the at least one first item category according to the first number of items, and determining the superior recommendation item category in the at least one first item category according to a result of the sorting.

4. The method according to claim 3, wherein the first item category comprises a first-level category in item categories.

5. The method according to claim 1, wherein determining the superior recommendation item category of each candidate recommendation initiation object comprises:
  obtaining, for follower objects of each candidate recommendation initiation object, at least one second item category of valid received items in a second reference period;
  counting a second number of items of the valid received items corresponding to each second item category;
  sorting the at least one second item category according to the second number of items, and determining the superior recommendation item category in the at least one second item category according to a result of the sorting.

6. The method according to claim 1, wherein determining the at least one recommendation matching factor value between the item to be recommended and each candidate recommendation initiation object comprises:
  obtaining a first item parameter of valid recommended items of each candidate recommendation initiation object within a third reference period, and obtaining a second item parameter of the item to be recommended, matching the second item parameter with the first item parameter, determining a third number of items successfully matched in the valid recommended items within the third reference period according to a result of matching, determining the third number of items as the recommendation matching factor value; and/or,
  obtaining, for follower objects of each candidate recommendation initiation object, a third item parameter of valid received items within a fourth reference period, and obtaining a fourth item parameter of the item to be recommended, matching the third item parameter with the fourth item parameter, determining a fourth number of items successfully matched in the valid received items within the fourth reference period according to a result of matching, determining the fourth number of items as the recommendation matching factor value; and/or,
  determining a similar recommendation initiation object fulfilling a preset similar condition with each candidate recommendation initiation object, and obtaining valid recommended items of the similar recommendation initiation object in a fifth reference period, determining a fifth number of items of valid recommended items matching with the item to be recommended in the valid recommended items within the fifth reference period, determining the fifth number of items as the recommendation matching factor value; and/or,
  obtaining valid recommended items of each candidate recommendation initiation object within a sixth reference period, counting a sixth number of items with a similarity to the item category of the item to be recommended greater than a preset similarity threshold in the valid recommended items within the sixth reference period, determining the sixth number of items as the recommendation matching factor value.

7. The method according to claim 1, wherein if the at least one recommendation matching factor value comprises a plurality of recommendation matching factor values, computing the recommendation matching degree according to the at least one recommendation matching factor value comprises:
  normalizing, for each recommendation matching factor value, the recommendation matching factor value to obtain a normalized value corresponding to the recommendation matching factor value; obtaining a preset weight value corresponding to the recommendation matching factor value; performing a product calculation on the preset weight value corresponding to the recommendation matching factor value and the normalized value to obtain a product value corresponding to the recommendation matching factor value;
  summing the product values corresponding to the plurality of recommendation matching factor values respectively as the recommendation matching degree.

8. The method according to claim 1, wherein determining the target recommendation initiation object for the item to be recommended in the at least one candidate recommendation initiation object according to the superior recommendation item category and the recommendation matching degree comprises:
  determining, in the at least one candidate recommendation initiation object, an initial recommendation initiation object corresponding to the superior recommendation item category comprising the item category of the item to be recommended;
  determining, in case of a plurality of the initial recommendation initiation objects being obtained, a highest value of a plurality of recommendation matching degrees corresponding to the plurality of the initial recommendation initiation objects;
  determining the initial recommendation initiation object corresponding to the highest value as the target recommendation initiation object.

9. The method according to claim 1, wherein determining the target recommendation initiation object for the item to be recommended in the at least one candidate recommendation initiation object according to the superior recommendation item category and the recommendation matching degree comprises:
  in response to receiving a trigger operation on the recommendation page, determining the candidate recommendation initiation object corresponding to the trigger operation as the target recommendation initiation object.

10. The method according to claim 1, wherein transmitting information related to the item to the target recommendation initiation object comprises:
   obtaining recommendation reason information and item detail information for the item to be recommended;
   generating an item recommendation link corresponding to the recommendation reason information and item detail information;
   transmitting the item recommendation link to the target recommendation initiation object.

11. The method according to claim 10, wherein the recommendation reason information is edited by the request object.

12. An electronic device, wherein the electronic device comprises:
   a processor;
   a memory for storing processor executable instructions;
   the processor used to read the executable instructions from the memory and execute the executable instructions to implement acts of item recommendation processing, the acts comprising:
   in response to a recommendation request for an item recommendation initiation object displaying a recommendation page of an application, wherein the recommendation page comprises at least one candidate recommendation initiation object and a superior recommendation item category of each candidate recommendation initiation object, wherein the superior recommendation item category comprises a recommendation item category which is successfully recommended to each candidate recommendation initiation object and a number of items meets a predetermined number threshold;
   computing a recommendation matching degree between an item to be recommended and each candidate recommendation initiation object respectively, wherein the recommendation matching degree is used to identify a strength of a recommendation ability of each candidate recommendation initiation object for the items to be recommended,
      wherein computing the recommendation matching degree between the item to be recommended and each candidate recommendation initiation object comprises:
      determining at least one recommendation matching factor value between the item to be recommended and each candidate recommendation initiation object;
      computing the recommendation matching degree according to the at least one recommendation matching factor value,
   determining a target recommendation initiation object for the item to be recommended in the at least one candidate recommendation initiation object according to the superior recommendation item category and the recommendation matching degree of each candidate recommendation initiation object; and
   in accordance with a determination of the target recommendation initiation object, transmitting information related to the item to the target recommendation initiation object.

13. The device according to claim 12, wherein determining the at least one candidate recommendation initiation object comprises:
   obtaining a recommendation initiation object identifier corresponding to the recommendation request;
   determining, in an associated object set, at least one associated recommendation initiation object matching the recommendation initiation object identifier as the at least one candidate recommendation initiation object, wherein,
   the associated object set comprises at least one associated recommendation initiation object having a preset association relationship with a request object corresponding to the recommendation request.

14. The device according to claim 12, wherein determining the superior recommendation item category of each candidate recommendation initiation object comprises:
   obtaining, for each candidate recommendation initiation object, at least one first item category of valid recommended items in a first reference period;
   counting a first number of items of the valid recommended items corresponding to each first item category;
   sorting the at least one first item category according to the first number of items, and determining the superior recommendation item category in the at least one first item category according to a result of the sorting.

15. The device according to claim 12, wherein a first item category comprises a first-level category in item categories.

16. The device according to claim 12, wherein determining the superior recommendation item category of each candidate recommendation initiation object comprises:
   obtaining, for follower objects of each candidate recommendation initiation object, at least one second item category of valid received items in a second reference period;
   counting a second number of items of the valid received items corresponding to each second item category;
   sorting the at least one second item category according to the second number of items, and determining the superior recommendation item category in the at least one second item category according to a result of the sorting.

17. The device according to claim 12, wherein determining the at least one recommendation matching factor value between the item to be recommended and each candidate recommendation initiation object comprises:
   obtaining a first item parameter of valid recommended items of each candidate recommendation initiation object within a third reference period, and obtaining a second item parameter of the item to be recommended, matching the second item parameter with the first item parameter, determining a third number of items successfully matched in the valid recommended items within the third reference period according to a result of matching, determining the third number of items as the recommendation matching factor value; and/or,
   obtaining, for follower objects of each candidate recommendation initiation object, a third item parameter of valid received items within a fourth reference period, and obtaining a fourth item parameter of the item to be recommended, matching the third item parameter with the fourth item parameter, determining a fourth number of items successfully matched in the valid received items within the fourth reference period according to a result of matching, determining the fourth number of items as the recommendation matching factor value; and/or,
   determining a similar recommendation initiation object fulfilling a preset similar condition with each candidate recommendation initiation object, and obtaining valid recommended items of the similar recommendation initiation object in a fifth reference period, determining a fifth number of items of valid recommended items matching with the item to be recommended in the valid recommended items within the fifth reference period, determining the fifth number of items as the recommendation matching factor value; and/or, obtaining valid recommended items of each candidate recommendation initiation object within a sixth reference period, counting a sixth number of items with a similarity to the item category of the item to be recommended greater than a preset similarity threshold in the valid recommended items within the sixth reference period, determining the sixth number of items as the recommendation matching factor value.

18. The device according to claim 12, wherein if the at least one recommendation matching factor value comprises a plurality of recommendation matching factor values, computing the recommendation matching degree according to the at least one recommendation matching factor value comprises:

normalizing, for each recommendation matching factor value, the recommendation matching factor value to obtain a normalized value corresponding to the recommendation matching factor value; obtaining a preset weight value corresponding to the recommendation matching factor value; performing a product calculation on the preset weight value corresponding to the recommendation matching factor value and the normalized value to obtain a product value corresponding to the recommendation matching factor value;

summing the product values corresponding to the plurality of recommendation matching factor values respectively as the recommendation matching degree.

19. The device according to claim 12, wherein determining the target recommendation initiation object for the item to be recommended in the at least one candidate recommendation initiation object according to the superior recommendation item category and the recommendation matching degree comprises:

determining, in the at least one candidate recommendation initiation object, an initial recommendation initiation object corresponding to the superior recommendation item category comprising the item category of the item to be recommended;

determining, in case of a plurality of the initial recommendation initiation objects being obtained, a highest value of a plurality of recommendation matching degrees corresponding to the plurality of the initial recommendation initiation objects;

determining the initial recommendation initiation object corresponding to the highest value as the target recommendation initiation object.

20. A non-transitory computer-readable storage medium, wherein the computer-readable storage medium stores a computer program for performing acts of item recommendation processing, the acts comprising:

in response to a recommendation request for an item recommendation initiation object displaying a recommendation page of an application, by an electronic device, wherein the recommendation page comprises at least one candidate recommendation initiation object and a superior recommendation item category of each candidate recommendation initiation object, wherein the superior recommendation item category comprises a recommendation item category which is successfully recommended to each candidate recommendation initiation object and a number of items meets a predetermined number threshold;

computing, by the electronic device, a recommendation matching degree between a respectively, wherein the recommendation matching degree is used to identify a strength of a recommendation ability of each candidate recommendation initiation object for the items to be recommended, wherein computing, by the electronic device, the recommendation matching degree between the item to be recommended and each candidate recommendation initiation object comprises:

determining, by the electronic device, at least one recommendation matching factor value between the item to be recommended and each candidate recommendation initiation object;

computing, by the electronic device, the recommendation matching degree according to the at least one recommendation matching factor value, determining, by the electronic device, a target recommendation initiation object for the item to be recommended in the at least one candidate recommendation initiation object according to the superior recommendation item category and the recommendation matching degree of each candidate recommendation initiation object; and in accordance with a determination of the target recommendation initiation object, transmitting information related to the item to the target recommendation initiation object.

* * * * *